Jan. 14, 1964     R. R. MATTHEWS     3,117,611
CLINCH NUT HAVING ADJACENT FRUSTO-CONICAL SURFACES ADAPTED
TO BE SECURED IN A SHEET METAL MEMBER
Filed April 3, 1961
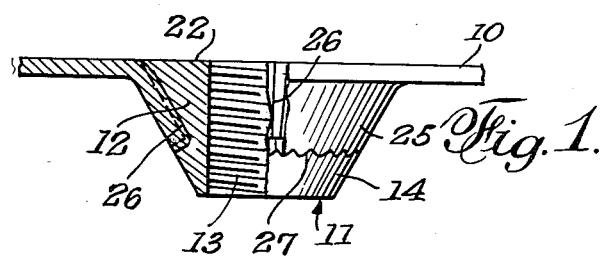
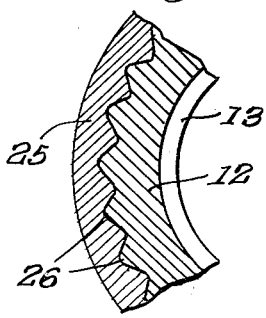
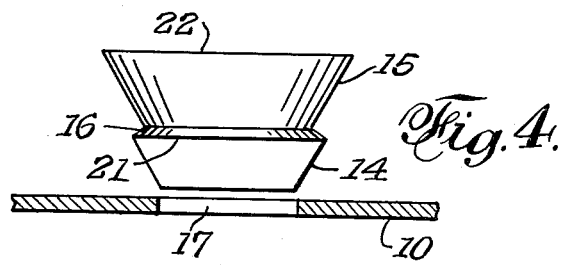
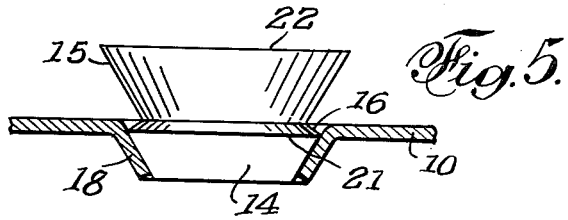
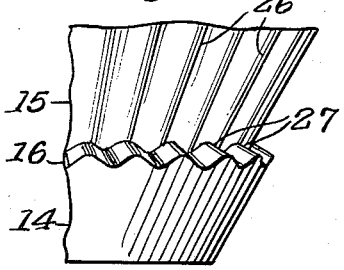
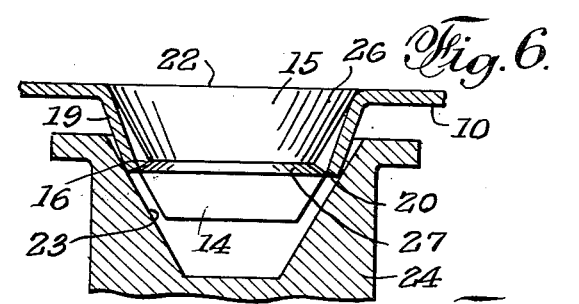
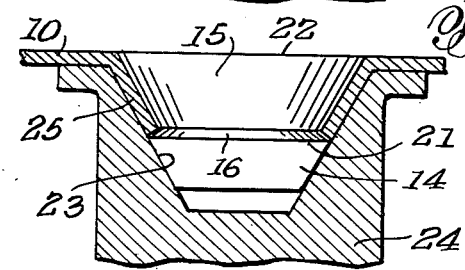
INVENTOR.
RICHARD R. MATTHEWS
BY C. F. Stratton
ATTORNEY

United States Patent Office 3,117,611
Patented Jan. 14, 1964

3,117,611
CLINCH NUT HAVING ADJACENT FRUSTO-CONICAL SURFACES ADAPTED TO BE SECURED IN A SHEET METAL MEMBER
Richard R. Matthews, Pico-Rivera, Calif.
(7950 Alameda St., Huntington Park, Calif.)
Filed Apr. 3, 1961, Ser. No. 100,220
2 Claims. (Cl. 151—41.73)

This invention relates to a clinch nut, the same comprising a nut so affixed to a sheet of soft metal as to provide said sheet with means to effect connection with a threaded element, such as a screw or stud. The present structure may also be termed a pressed nut.

An object of the present invention is to provide a novel and improved clinch nut structure that insures firm, non-rotational assembly of the nut and its mounting metal sheet.

Another object fo the invention is to provide means of the character referred to that can be assembled with easy facility to provide a neat and smooth connection of the hard metal of the insert and the softer metal of the sheet.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view, in quarter-section, of a clinch nut according to the present invention.

FIG. 2 is an enlarged and fragmentary cross-sectional detail view thereof.

FIG. 3 is a similarly enlarged fragmentary side elevational view showing details of the nut.

FIGS. 4, 5, 6 and 7 are cross-sectional views showing successive steps in the connection of the present nut to a metal sheet.

The sheet 10 is representative of a sheet of soft metal, such as aluminum. Such a sheet is too soft to be provided with a tapped hole, as can steel or other hard metal sheets, since the threads of such a hole would not retain their screw-holding properties under endwise forces on said screws. According to the present invention, the sheet 10 is provided with a nut 11, thereby providing the sheet with screw-holding ability.

Said nut is formed of a hard metal body 12, in which a screw seat or bore 13 is provided, that has a frusto-conical smaller end portion 14, a frusto-conical larger end portion 15, and a frusto-conical shoulder 16 where the larger end of the smaller portion 14 joins with the smaller end of the larger portion 15.

The conical portion 14, as seen in FIG. 5, is proportioned to enter a hole 17 provided in sheet 10 and to so expand said hole as to first form the sheet metal therearound into the conical flange 18 of said FIG. 5, and then into the expanded conical flange 19 of FIG. 6 as the annular end 20 of the sheet metal flange moves past the annular edge 21 where the portion 14 and shoulder 16 join. It is merely necessary to force the small end of the nut through the hole 17, until the larger end face 22 achieves a substantially flush position with the sheet 10, for the flange end 20 to be outward of and substantially aligned with the shoulder 16, as in FIG. 6.

It will be noted that the two conical portions 14 and 15 are so proportioned that the depth of shoulder 16 is substantially the same as the thickness of the conical flange 19. As a consequence, when said flange is contracted inwardly around the conical portion 15, as by means of the conical face 23 of a tool 24, a contracted conical flange 25 is formed around said portion 15 and in tight-fitting engagement therewith. The nut 11 is thus affixed to the sheet 10 and firmly held against endwise movement relative to the plane of sheet 10, since the flange end 20 is firmly seated against the annular abutment 16.

In order to hold the nut 11 against rotation under torque forces thereon, the face of part 15 is provided with knurls, or ribs, or is otherwise provided with roughening, as at 26, the same, because the soft metal of the flange 25 conforms thereto, interlocking with nut and flange as illustrated in FIG. 1 and FIG. 2 to obviate relative rotation, as mentioned. The abutment shoulder 16 may have similar roughening 27 which serrates the end of flange 25, as can be seen in FIG. 1, further increasing anti-rotation properties of the construction.

Regardless what means is employed to secure the nut 11 to the sheet, the structure, as in FIG. 1, constitutes a clinch nut having threads 13 so that a screw, bolt or stud engaged in said threads may be applied with considerably greater torque than can be withstood by threads formed directly in the metal of sheet 10.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A clinch nut comprising a hard metal body having a threaded seat extending longitudinally therein, said body having a flat end face, a frusto-conical portion extending from said face and having a surface provided with knurls extending along the slant height of said surface, an inverted frusto-conical shoulder at the small end of said conical portion and directed toward said end face and having a surface provided with knurls extending along the slant height of said latter surface, and a frusto-conical portion smaller than the first-mentioned portion and extending from said shoulder, said smaller frusto-conical portion having a surface with a slant height that is parallel to the slant height of the larger frusto-conical portion and terminating in a flat end face parallel to the mentioned end face; and a shoft metal sheet provided with a conical flange that is contracted around the larger conical portion of the body and exactly fitting and in torque-transmitting engagement with the mentioned knurls in the first two mentioned frusto-conical portions of the body, the conical face of the smaller conical portion and the frusto-conical outer face of the mentioned flange forming a continuous surface.

2. A clinch nut comprising a hard metal body having a threaded seat extending longitudinally therein, said body having a flat end face, a frusto-conical portion extending from said face, an inverted frusto-conical shoulder at the small end of said conical portion and directed toward said end face and having a surface provided with knurls extending along the slant height of said latter surface, and a frusto-conical portion smaller than the first-mentioned portion and extending from said shoulder, said smaller frusto-conical portion having a slant height that is parallel to the slant height of the larger frusto-conical portion and terminating in a flat end face parallel to the mentioned end face; and a soft metal sheet provided with a conical flange that is contracted around the larger conical portion of the body and having an end edge in torque-transmitting engagement with the mentioned knurls in the slant height of the inverted frusto-conical shoulder, the conical face of the smaller conical portion and the frusto-conical outer face of the mentioned flange forming a continuous surface.

References Cited in the file of this patent

UNITED STATES PATENTS

| | | |
|---|---|---|
| 1,007,553 | Glauber | Oct. 31, 1911 |
| 2,490,594 | Madden | Dec. 6, 1949 |
| 2,687,831 | Miller | Aug. 31, 1954 |
| 3,053,300 | Quinto | Sept. 11, 1962 |